Patented Apr. 11, 1950

2,503,963

UNITED STATES PATENT OFFICE 2,503,963

METHOD FOR PREPARING A FISCHER-TROPSCH CATALYST

Max A. Mosesman, Baytown, Tex., assignor, by mesne assignments, to Standard Oil Development Company, Elizabeth, N. J., a corporation of Delaware No Drawing. Original application December 20, 1946, Serial No. 717,583. Divided and this application August 15, 1949, Serial No. 110,472

4 Claims. (Cl. 252—474)

This application is a division of Serial No. 717,583, filed December 20, 1946.

This invention is directed to a method for preparing a composition adapted to be used as a catalyst. More particularly, this invention relates to a method for preparing a promoted catalyst for utilization in the hydrogenation of carbon oxides.

It is well known to the art to synthesize hydrocarbons and oxygenated derivatives of hydrocarbons by passing a mixture of carbon monoxide and hydrogen over a suitable catalyst at elevated temperatures and pressures. This reaction is commonly designated as the Fischer-Tropsch synthesis and is usually carried out at temperatures in the range of about 450° to 675° F. and pressures in the range of 100 to 500 pounds per square inch. Such reactions have customarily been carried out in the presence of catalysts comprising the oxides of metals in group VIII of the periodic table such as the oxides of iron, cobalt, and nickel. It is also known to use such oxides as catalyst either alone or supported on an inert material such as alumina, kieselguhr, and other such supporting agents. It has also been known to add to the active catalytic material in the catalyst composition a substance usually designated as a promoter which exerts a specific effect on the catalyst activity, selectivity of the reactants to useful products, and on the active life of the catalyst. Catalysts containing promoters in substantially small quantities often permit consistently high conversion of the reactants to desired products over much longer periods of operation than is possible when using an unpromoted catalyst.

It is the object of the present invention to provide a method for preparing an improved catalyst. A pertinent object of the present invention is to devise a method for preparing a catalyst particularly adapted for use in the Fischer-Tropsch synthesis. Another object of this invention is to prepare a catalyst that may be utilized in the synthesis of high yields of useful products by the hydrogenation of carbon oxides during long periods of operation.

The present invention may be described briefly as involving the preparation of a catalyst comprising a major portion of iron or an iron oxide as the active catalyst material and a minor portion of alkali metal ferrate as the promoting material. Specific examples of the alkali metal ferrates include potassium ferrate ($K_2FeO_4$), sodium ferrate and lithium ferrate.

The present invention will be further illustrated by a method of preparing an iron oxide catalyst comprising an alkali metal ferrate promoter. A previously dried intimate mixture of one part by weight of fine iron powder and two parts by weight of potassium nitrate was placed on an iron plate and distributed as a layer of approximately 2 centimeters depth. A second layer of approximately equal parts by weight of iron powder and potassium nitrate was then placed adjacent to the first layer. The second layer was then ignited and the reaction allowed to go to completion. A dense white cloud of volatile potassium formed which was removed from the reaction zone. The reaction product was cooled sufficiently for handling and removed from the iron plate and heated in a free oxygen containing atmosphere at approximately 1000° F. for about 4 hours. After the foregoing calcining operation, the reaction product was ground into a fine powder and pilled into one-eighth inch pills. Subsequent to the pilling operation, the pills were placed in a reaction chamber and reduced in the presence of hydrogen for 24 hours at a temperature of 700° F. and at atmospheric pressure. The hydrogen was passed over the catalyst at a feed rate of hydrogen of 1000 volumes per volume of catalyst per hour.

The catalyst prepared as described in the foregoing paragraph was then employed to synthesize hydrocarbons from an equal mixture of hydrogen and carbon monoxide. The feed mixture of hydrogen and carbon monoxide was passed over the catalyst at a pressure of 150 p. s. i. g., a temperature of 575° F. and at a feed rate of 200 volumes per volume of catalyst. The catalyst prepared in accordance with this method of the present invention gives good yields of hydrocarbon and oxygenated compounds which may be obtained over substantial periods of operating time.

While examples of temperature and pressure conditions suitable for use in the practice of the present invention have been given to illustrate its advantages, it will be obvious to a worker skilled in the art that temperatures and pressures over a substantial range may be employed and good results obtained. It will also be obvious that the promoting material admixed with the iron or iron oxide catalyst may be present over a substantial range and satisfactory results obtained. It is not intended that the above-cited examples limit the scope of my invention.

Having fully described and illustrated the practice of the present invention, what I wish to claim as new and useful and to secure by Letters Patent is:

1. A method for preparing a catalyst adapted for use in a Fischer-Tropsch synthesis which consists of the steps of forming a mixture of approximately two parts of finely divided iron and approximately three parts of alkali metal nitrate, igniting the mixture and allowing the ignited mixture to form a reaction product, subjecting the reaction product to a free oxygen-containing atmosphere at an elevated temperature of approximately 1000° F. for about four hours and subsequently contacting the oxidized mixture with a reducing atmosphere at an elevated temperature of approximately 700° F. for approximately 24 hours.

2. A method in accordance with claim 1 in which the alkali metal nitrate is potassium nitrate.

3. A method in accordance with claim 1 in which the alkali metal nitrate is sodium nitrate.

4. A method in accordance with claim 1 in which the alkali metal nitrate is lithium nitrate.

MAX A. MOSESMAN.

REFERENCES CITED

The following references are of record in the file of this patent:

UNITED STATES PATENTS

| Number | Name | Date |
|---|---|---|
| 2,093,504 | Zirngibl | Sept. 21, 1937 |

FOREIGN PATENTS

| Number | Country | Date |
|---|---|---|
| 2,308 | Great Britain | 1914 |